(12) United States Patent
Mohtadi et al.

(10) Patent No.: US 8,377,555 B2
(45) Date of Patent: Feb. 19, 2013

(54) GAS STORAGE MATERIALS, INCLUDING HYDROGEN STORAGE MATERIALS

(75) Inventors: Rana F. Mohtadi, Northville, MI (US); George G. Wicks, Aiken, SC (US); Leung K. Heung, Aiken, SC (US); Kenji Nakamura, Toyota (JP)

(73) Assignees: Toyota Motor Engineering & Manufacturing North America, Inc., Erlanger, KY (US); Savannah River Nuclear Solutions, LLC, Aiken, SC (US)

( * ) Notice: Subject to any disclaimer, the term of this patent is extended or adjusted under 35 U.S.C. 154(b) by 809 days.

(21) Appl. No.: 12/035,908

(22) Filed: Feb. 22, 2008

(65) Prior Publication Data

US 2009/0211399 A1    Aug. 27, 2009

(51) Int. Cl.
   C22C 29/12    (2006.01)
(52) U.S. Cl. .................................................... 428/404
(58) Field of Classification Search .............. 428/403, 428/404
   See application file for complete search history.

(56) References Cited

U.S. PATENT DOCUMENTS

| | | | |
|---|---|---|---|
| 4,257,798 A | 3/1981 | Hendricks et al. | |
| 4,303,431 A | 12/1981 | Torobin | |
| 4,637,990 A * | 1/1987 | Torobin | 502/10 |
| 6,270,836 B1 | 8/2001 | Holman | |
| 6,528,441 B1 * | 3/2003 | Heung et al. | 501/12 |
| 6,713,519 B2 * | 3/2004 | Wang et al. | 518/715 |
| 7,198,867 B2 | 4/2007 | Sanders | |
| 7,279,222 B2 * | 10/2007 | Hearley et al. | 428/403 |
| 7,771,512 B2 * | 8/2010 | Norton et al. | 95/116 |
| 2002/0004111 A1 | 1/2002 | Matsubara et al. | |
| 2004/0213998 A1 * | 10/2004 | Hearley et al. | 428/402 |
| 2005/0287676 A1 | 12/2005 | Lemmon et al. | |
| 2006/0059953 A1 | 3/2006 | Heung et al. | |
| 2006/0060820 A1 | 3/2006 | Schumacher et al. | |
| 2006/0063003 A1 | 3/2006 | Yang et al. | |
| 2006/0201163 A1 | 9/2006 | Haefner et al. | |
| 2006/0264324 A1 * | 11/2006 | Schuth et al. | 502/400 |
| 2007/0196701 A1 * | 8/2007 | Roberts et al. | 429/13 |

FOREIGN PATENT DOCUMENTS

| | | |
|---|---|---|
| CA | 1126033 | 6/1982 |
| JP | 58-223606 | 12/1983 |
| JP | 02153838 | 6/1990 |
| RU | 2205802 | 6/2003 |

OTHER PUBLICATIONS

Brower et al. (Preparation and Properties of Aluminum Hydrid, J. Am. Chem. Soc. 98:9 p. 2450-2453, 1975).*
Graetz et al. (Aluminum hydride as a hydrogen and energy storage material: Past, present and future, Journal of Alloys and Compounds. 5095 (2011) 5517-5528).* J. Shelby, D. Rapp; "Accelerated Hydrogen Diffusion Through Glass Microspheres: An Enabling Technology for a Hydrogen Economy," Center for Environmental and Energy Research at Alfred University.

* cited by examiner

*Primary Examiner* — Alicia Chevalier
*Assistant Examiner* — Alexandre Ferre
(74) *Attorney, Agent, or Firm* — Gifford, Krass, Sprinkle, Anderson & Citkowski, P.C.

(57) ABSTRACT

A material for the storage and release of gases comprises a plurality of hollow elements, each hollow element comprising a porous wall enclosing an interior cavity, the interior cavity including structures of a solid-state storage material. In particular examples, the storage material is a hydrogen storage material such as a solid state hydride. An improved method for forming such materials includes the solution diffusion of a storage material solution through a porous wall of a hollow element into an interior cavity.

12 Claims, 4 Drawing Sheets

GAS STORAGE MATERIALS, INCLUDING HYDROGEN STORAGE MATERIALS

STATEMENT AS TO RIGHTS TO INVENTIONS MADE UNDER FEDERALLY SPONSORED RESEARCH AND DEVELOPMENT

This invention was made under CRADA CR-04-003 between Toyota Motor Engineering & Manufacturing North America, Inc., and Savannah River National Laboratory, operated for the United States Department of Energy by Savannah River Nuclear Solutions, LLC. The Government has certain rights in the invention.

FIELD OF THE INVENTION

The present invention relates to gas storage materials, such as hydrogen storage materials.

BACKGROUND OF THE INVENTION

There are many possible applications of hydrogen fuel, such as hydrogen-powered vehicles. However, hydrogen in the gaseous state is highly explosive. In the field of hydrogen-powered vehicles, hydrogen may be stored on board the vehicle in high pressure tanks, for example at 5,000-10,000 psi gas pressure. Such storage systems are not efficient on a volumetric level, and also present serious safety concerns. There is a great commercial need for new methods of storing hydrogen in a safe manner.

SUMMARY OF THE INVENTION

Examples of the present invention provide improved solid state storage of gases, in particular storage of hydrogen using metal hydrides such as alanates or borohydrides. A storage material allows release and optionally uptake of a gas, such as a hydride in the case of hydrogen storage materials. The storage material may be disposed as nanoscale structures within an interior cavity of a hollow element, for example on the inside surfaces of the hollow elements. The hollow elements may hollow glass elements, for example hollow glass microspheres. The hollow elements may have a porous wall surrounding an interior cavity, which allow introduction of the storage material as a solution into the interior, and removal of the solvent to leave structured solid forms of the storage material within the interior of the hollow element, such as elongated structures (such as needle-like nanocrystals) grown on an interior surface of the porous wall, for example elongate crystals nucleated onto surface defects of the interior surface.

Embodiments of the present invention include solid state hydrogen storage materials encapsulated within porous-walled hollow elements such as hollow glass microspheres. Hydrogen storage materials include complex metal hydrides, including solid hydride materials such as alkaline and alkaline earth cation based alanates (alkali metal aluminum hydrides or alkaline earth metal aluminum hydrides) or borohydrides. Complex metal hydride materials are generally air and moisture sensitive, and may be dangerously reactive in bulk. Examples of the present invention include composite materials including such storage materials within the cavities of hollow elements, allowing safer handling of storage materials for applications such as vehicles, including automobiles and the like.

In particular, examples of the present invention include methods and materials that facilitate the safer storage of reactive hydrogen storage materials, such as reactive metal hydrides. Examples of the present invention allow reduced exposure of a storage material to air and moisture, and allow easier handling of the storage materials, for example within an onboard tank of a vehicle.

Examples of the present invention include a method of encapsulating a gas storage material, such as a hydride, in a hollow element, the hollow element having an interior cavity surrounded by a porous wall, by dissolving the storage material in a solvent and allowing the resulting storage material solution to diffuse into the interior of the hollow element. The storage material may be precipitated within the hollow element by evaporating the solvent, for example under reduced pressure such as a partial vacuum. In representative examples, the hollow element is a hollow glass microsphere (HGM).

An example material for the storage and release of a gas, such as hydrogen, comprises a plurality of hollow elements, each hollow element comprising a gas-permeable wall enclosing an interior cavity, the interior cavity including a solid state gas storage material in the form of nanostructures. The hollow elements may be glass spheres having porous walls enclosing the interior cavity, such as glass microspheres having an average diameter of between 1 micron and 500 microns, more particularly between approximately 5 microns and approximately 100 microns. The porous walls may include pores having an average pore diameter in the range of 10 Angstroms to 3000 Angstroms, and the average wall thickness may be between 0.1 microns and 50 microns, more particularly between approximately 0.5 microns and approximately 5 microns. The storage material may be a metal hydride such as an alkali metal alanate, an alkaline earth metal alanate, an alkali metal borohydride, an alkaline earth metal borohydride, or a combination thereof.

An example method of preparing a material for storage of gases comprises providing a hollow element having a porous wall enclosing an interior cavity, introducing a storage material into the interior cavity by diffusion of a solution of the storage material through the porous wall, the solution being the storage material dissolved in a solvent, and removing the solvent from the interior cavity so as to precipitate nanostructures of the storage material within the interior cavity, for example onto the interior surface of the porous wall.

DETAILED DESCRIPTION OF THE INVENTION

Figure 1:
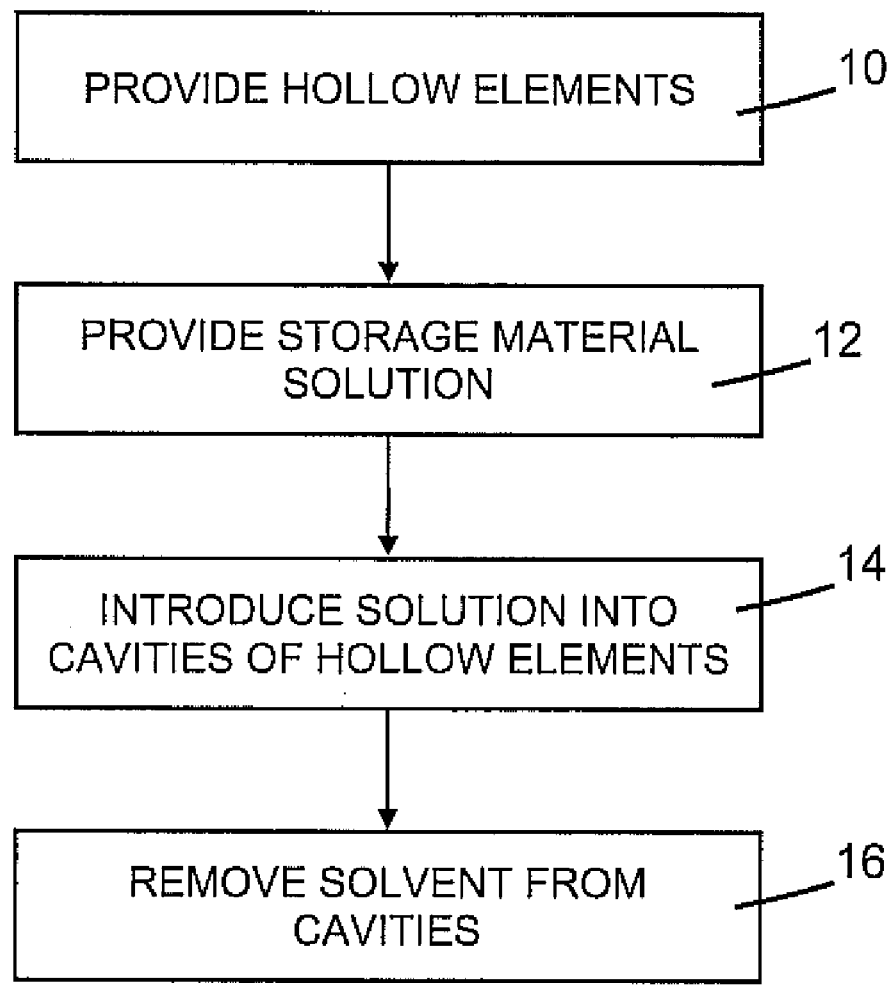
FIG. 1 illustrates a flow chart of preparing improved storage materials.

Examples of the present invention facilitate safe storage of reactive hydrogen storage materials without greatly compromising the properties of the storage materials. In some examples, the storage materials are provided as nanoscale structures within hollow elements, such as bundles of needle-like nanocrystals having a cross-sectional dimension (width) of less than approximately 1 micron. The hollow elements reduce the effects of ambient oxygen and moisture on the storage materials located therein. The hollow elements may be porous wall hollow glass spheres, such as microspheres.

The present invention is not limited to spheres, as the hollow elements may also comprise tubular structures, such as elongated hollow cylinders, ovoid forms, or other shapes. The hollow elements may be formed from any material stable in the intended operating environment such as silica-containing glass or other glasses, polymeric materials, ceramics, xeolites, and the like. Complex metal hydrides or other reactive materials may be encapsulated inside the porous walls of hollow elements.

Examples of the present invention include methods for encapsulating a gas storage material in an interior cavity of a hollow glass element. The hollow glass element may be a hollow glass microsphere having: a diameter in the range of approximately 1 micron to approximately 200 microns, more particularly a diameter of approximately 5 microns to approximately 100 microns; and a wall thickness in the range of approximately 0.1 microns to approximately 50 microns, more particularly between approximately 0.5 microns to approximately 5 microns. An example method includes chemical treatment (such as acid treatment) of the walls of the hollow glass elements to form porous network structure therein. Hollow element parameters such as wall thickness, element diameter, and pore diameter may be average thickness and average diameters, for example the median values for a representative sample of the hollow elements.

In some examples, a storage material is dissolved in a solvent to provide a storage material solution. The solvent may be an organic solvent such as tetrahydrofuran an ether (such as diethyl ether or dibutyl ether), a glyme (such as monoglyme, diglyme, or triglyme), or other solvent. In the case of alanates, preferred solvents include tetrahydrofuran or an ether such as diethyl ether. Heat and/or pressure may be used to facilitate the dissolution of the storage material in the solvent. The storage material solution is allowed to diffuse through the walls of the hollow elements so that the storage material solution enters the interior of the hollow elements. The storage material solution can be introduced in a low pressure environment (such as a partial vacuum) to facilitate solution entry into the cavities of the hollow elements. The storage material precipitates within the cavities of the hollow elements as the solvent evaporates.

Further, after solvent removal from the interior, a hydrogen-selective membrane such as a silica-based inorganic membrane, may be disposed on the outer surface of the glass elements using any appropriate method, such as a dry vacuum deposition process or wet sol-gel process.

The hollow elements may be hollow glass microspheres, such as hollow glass microspheres comprising a silica-based glass. In representative examples, the hollow elements are hollow glass spheres having a diameter in the range of approximately 5 microns to approximately 100 microns, and wall thickness or approximately 0.5 microns to approximately 5 microns. The hollow microspheres need not be perfectly spherical, so that the term diameter may represent any cross-sectional distance through an approximate center, and the wall thickness may be a mean value wall thickness for a variable thickness wall. The hollow glass spheres may initially have a non-porous wall, with pores introduced through a pore formation process. For example, hollow glass spheres may be treated with mineral acid to allow for porous network structure formation.

Examples of the present invention include a composite material in which reactive solid storage materials are encapsulated within the cavities of hollow elements, such as hollow glass spheres.

FIG. 1 shows a flow chart of an exemplary method. Box 10 corresponds to providing hollow elements with porous walls, each having at least one interior cavity surrounded by a wall that is at least in part porous. Box 12 corresponds to providing a storage material solution. Box 14 corresponds to introducing the storage material solution into the cavities of the hollow elements. Box 16 corresponds to removing the solvent from the cavities. After solvent removal, storage material is located within the cavities of the hollow elements.

Figure 2:
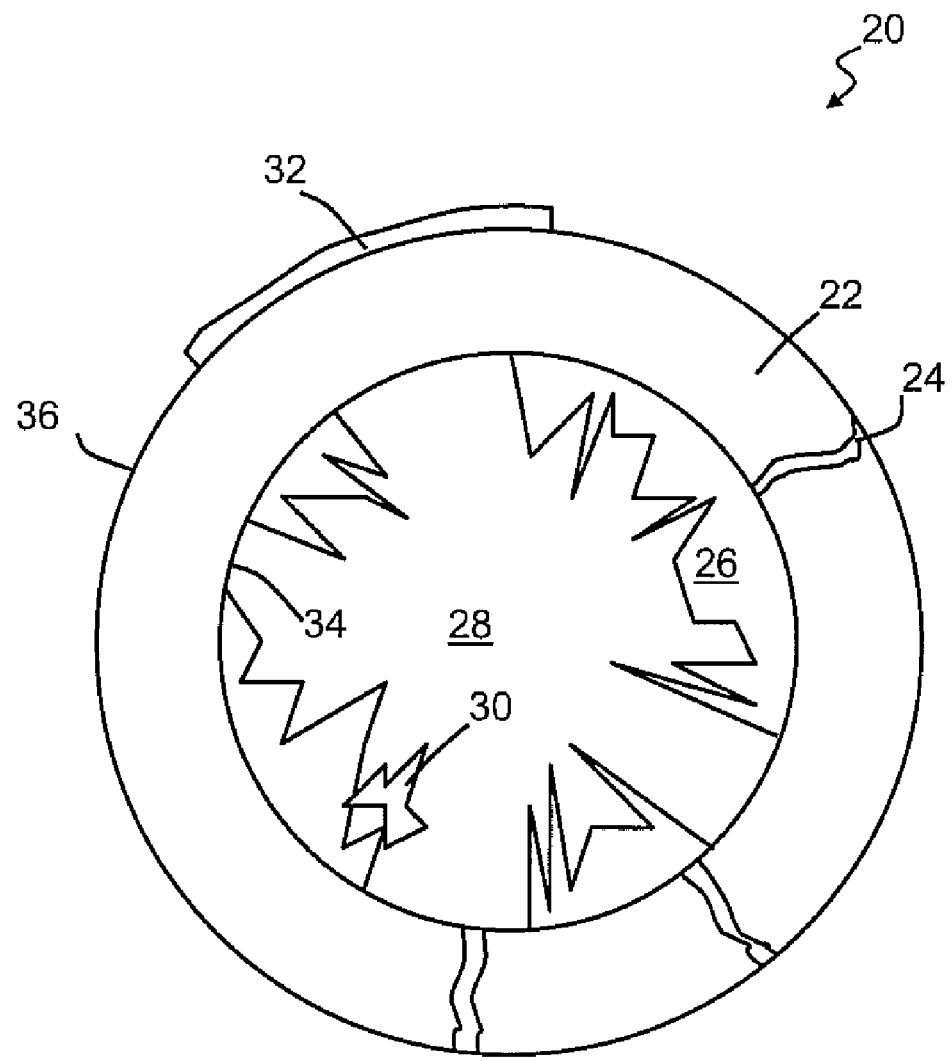
FIG. 2 is a schematic of an improved storage material.

FIG. 2 is a simplified cross-sectional schematic of an improved gas storage material according to embodiments of the present invention generally at 20. The figure shows a hollow element having a wall 20 enclosing an interior cavity 28. Pores, such as pore 24, allow fluids (liquids or gases) to pass from outside the hollow element into the interior cavity and vice versa. The figure shows a few representative pores, though preferably there are many more than shown. Hence, the wall is porous, but the pore distribution need not be uniform. The storage material is disposed as structures 26 on the interior surface 34 of the hollow element, and may also be present as particles 30 within the interior cavity 28. The structures may include elongated structures, such as needle-like crystals and bundles thereof, supported on the interior surface. An optional gas permeable membrane 32 (shown in part only) may be disposed on the exterior surface 36. The storage material may block some fraction of the pores.

EXAMPLES

Example composite materials were prepared. Hollow glass spheres were acid leached to allow for a porous network structure formation. The encapsulation procedure included dissolution of a reactive solid storage material in a solvent such as tetrahydrofuran (THF) or an ether such as diethyl ether. The dissolution was carried out at room temperature and ambient pressure, but elevated temperature and/or pressure may be used to enhance the dissolution of the material in the solvent. The solution was allowed to diffuse to occur through the pores of the hollow glass spheres walls. Precipitation of the reactive storage material within the interior cavity of the hollow spheres resulted from evaporating the solvent under vacuum.

Hollow spheres were prepared using phase-separated glass, as discussed in more detail below, and the microspheres were had porous walls with most pore diameters in the range of 100 Angstroms to a few thousands of Angstroms (e.g. 3,000 Angstroms). In other examples, pore diameters may range from approximately 10 Angstroms to approximately 1000 Angstroms. Sodium alanate diffusion at room temperature into the interior cavity of the glass spheres was allowed through solution diffusion, using $NaAlH_4$ dissolved in a tetrahydrofuran solvent. Microscopy characterization confirmed the encapsulation of the sodium alanate in the interior cavity of the hollow glass microspheres. Characterization followed passivation of the encapsulated alanate in air.

The presence of nanoscale-size crystal formation was observed on the interior surface of the glass wall. This shows that nano-crystallite formation of sodium alanate can be achieved by precipitating alanate on a silica surface. In this context, a nanocrystallite is a crystallite having a dimension (such as measured along a dimension normal to the direction of elongation) of less than a few microns, in some examples less than approximately 1 micron.

Figure 3:
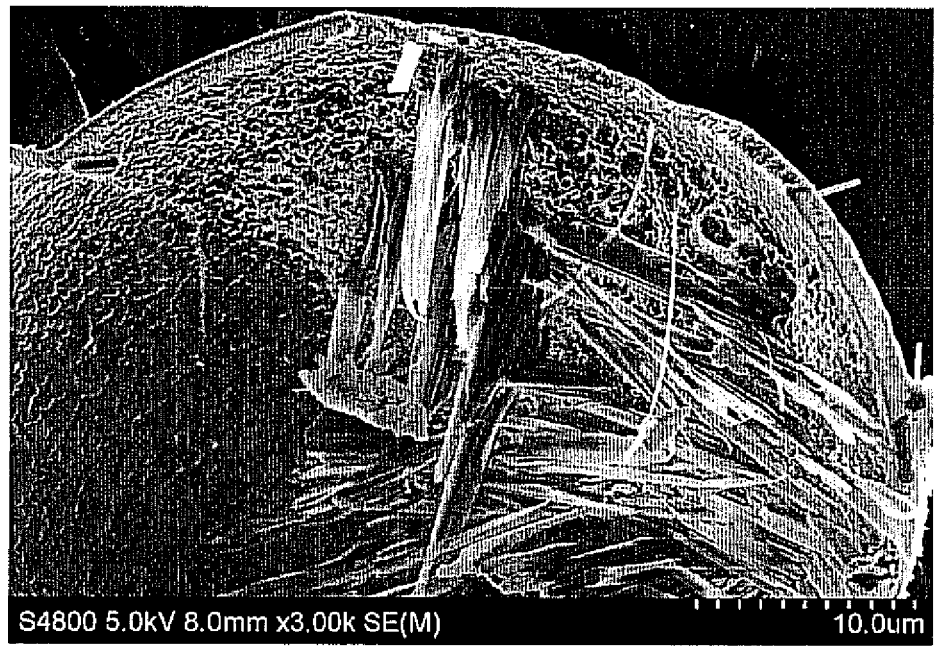
FIG. 3 is an electron micrograph showing sodium alanate encapsulation in a porous glass sphere.

FIG. 3 shows a scanning electron micrograph (SEM) showing proof of sodium alanate encapsulation within the wall of a porous glass sphere. The alanate diffused through the pores of the glass wall by solution diffusion into the interior cavity. Solvent removal from the interior cavity caused precipitation of the sodium alanate, and the sodium alanate was exposed to air prior to this SEM imaging. The alanate exists as needle-like structures within the interior cavity, facilitating hydrogen exchange.

This SEM micrograph demonstrates alanate precipitation and encapsulation following diffusion through the walls of porous glass spheres. The alanate material within the hollow spheres diffused through the pores of the glass walls by solution diffusion, followed by precipitation, and was exposed to air prior to the SEM imaging.

Figure 4:
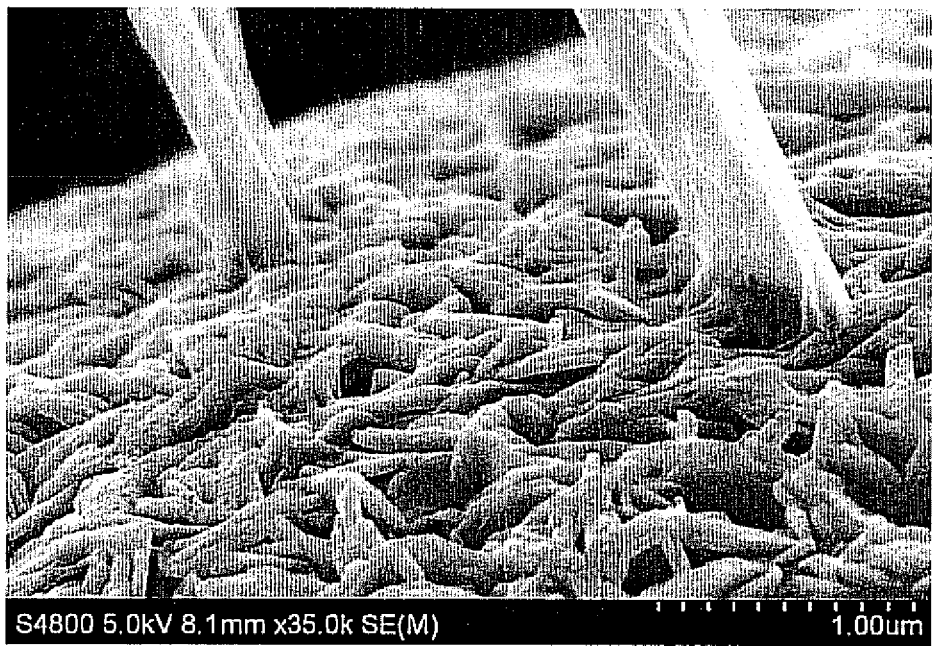
FIG. 4 is an electron micrograph of nanoscale sized alanate based bundled structures on the inner surface of a porous glass sphere.

FIG. 4 shows a SEM micrograph of nanoscale sized sodium alanate bundled structures formed on the inner surface of a porous glass sphere following sodium alanate precipitation and exposure to air. The interior surfaces of the silica-containing glass spheres provided nucleation sites for nano-sized sodium alanate crystal growth.

These figures demonstrate, for the first time, a nanostructured hydrogen storage material having a much greater surface area than the surface area of the interior surface facing the interior cavity. This facilitates release (and uptake) of a stored gas. Embodiments of the present invention include hollow elements including an interior cavity, the interior cavity being bounded by a porous wall having an interior surface area facing the cavity and including a structured solid state gas storage material presenting a surface area at least one order of magnitude greater than the interior surface area, and in some examples at least three orders of magnitude greater.

Materials allowing the storage and release of a gas may comprise a plurality of hollow elements each having a porous wall disposed around an interior cavity, the wall having an interior surface facing the interior cavity and an exterior surface, the interior cavity including a solid state gas storage material including structures supported by the interior surface of the wall, such as crystals nucleated by the interior surface of the wall. The structures may include microcrystals and/or nanocrystals, and may include elongated crystals such as needle-shaped crystals. An elongate form may have a length to width (e.g. cross-sectional diameter) ratio of at least approximately 3:1, and in some cases at least approximately 10:1. The elongated crystals may have a length, such as a median length, between 0.1 microns and the interior diameter of the interior cavity, such as between 0.1 microns and 10 microns, and a cross-sectional dimension (e.g. width) of less than 1 micron, more particularly between 0.1 microns and 1 micron.

Figure 5C:
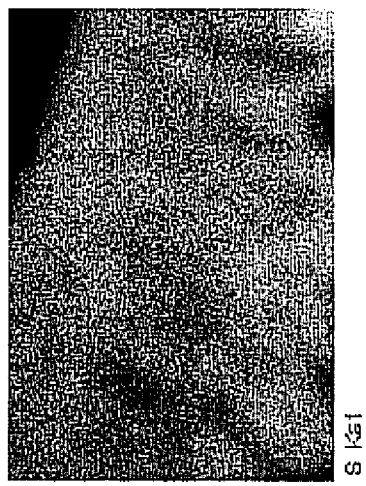
FIGS. 5A-5E illustrate elemental distributions through a porous glass wall.
Figure 5E:
Figure 5B:
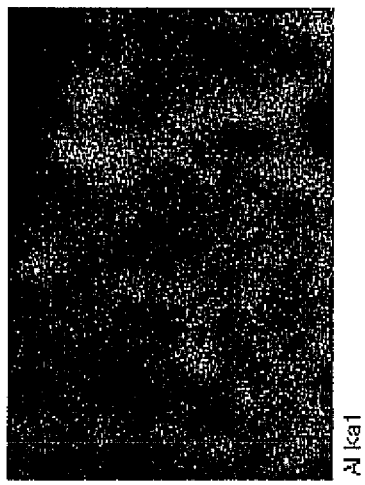
Figure 5D:
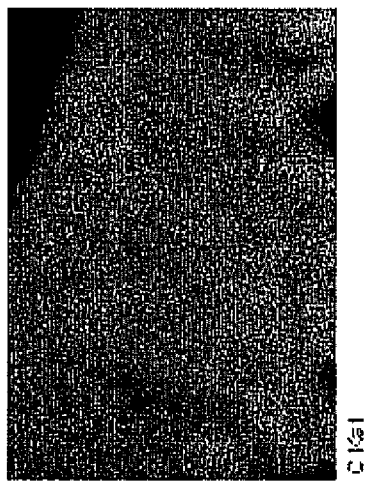
Figure 5A:
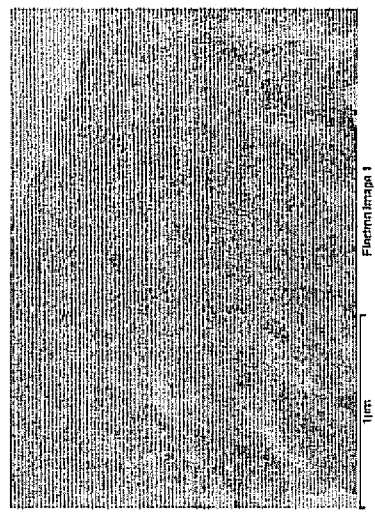

FIGS. 5A-5E illustrate elemental mapping for a cross-section of part of the wall of a porous silica glass sphere. FIG. 5A shows an electron micrograph, with the wall occupying most of the image, and an edge of the porous wall at the upper right of the image. These images are not necessary for an understanding of the present invention, but illustrate the presence of sodium and aluminum through the porous wall, indicating diffusion through the pores has occurred. FIGS. 5B, 5C, 5D, and 5E show aluminum, silicon, oxygen, and sodium distributions respectively, with dark regions indicating higher concentrations of the relevant element. The distribution of the sodium alanate elements (Na and Al) across the wall confirms through wall diffusion.

The presence of sodium and aluminum across the wall of a porous sphere illustrates alanate diffusion through pores. Elemental mapping of a porous glass sphere cross-section, discussed above, showed the distribution of sodium alanate elements (Na and Al) across the wall which confirmed through-wall diffusion in the encapsulation process. The novel encapsulation process further allows new alanate compositions to be created, and nanostructures to form.

The encapsulated form of alanate, in the form of solid state alanate within interior cavities of the hollow elements, can greatly reduce the well-known sodium alanate reversibility problem, following alanate dehydrogenation to aluminum metal and sodium hydrides. The reversibility problem is believed to be due to long-range diffusion between the aluminum and the sodium hydride formed following decomposition of the sodium alanate, and the use of alanate nanostructures reduces the aluminum metal diffusion path and may greatly improve reversibility. In some examples of the present invention, alanate reversal is possible without the use of dopants such as titanium, which are conventionally required with alanate storage materials.

A hydrogen selective permeable membrane such as silica based inorganic membrane can be disposed on the outer surface of the hollow spheres if desired, for example using a dry vacuum vapor deposition process or a wet sol get process.

Storage Materials

Hydrogen storage materials include hydrides, such as complex metal hydrides, including alanates and borohydrides. Examples include alkali and alkaline earth cation based alanates or borohydrides. Hydrogen storage materials also include metals forming interstitial hydrides, palladium. Alkali cation alanates include sodium alanate (sometimes referred to as sodium aluminum hydride). The formula of sodium alanate is sometimes written as $NaAlH_z$, where z is 4, but the term sodium alanate includes non-stoichiometric forms in which the ratio of sodium and aluminum may vary from unity, and further the parameter z may also vary depending on the circumstances, environment, and application.

Specific examples of storage materials include metal hydrides such as sodium alanate (sodium aluminum hydride), lithium alanate (lithium aluminum hydride), transition metal alanates such as titanium alanate (titanium aluminum hydride), other complex hydrides, borohydrides (such as lithium borohydride, also including catalyzed borohydrides), and combinations of two or more hydrogen storage materials. A metal hydride may be chosen to be solid at room temperature, or solid over a typical operational range of an apparatus using the storage material as a source of hydrogen fuel.

Example complex metal hydrides may have a formula of the form $M_aM'_bH_z$, where M is a metal cation or cation complex, and M' is a metal or metalloid. For example, M may be an alkali metal cation, alkaline earth metal, other metal, or metal complex, and M' may be a group 13 element such as boron or aluminum. Complex metal hydrides also include salts such as $[MgBr(THF)_2]_4FeH_6$ and $K_2ReH_9$.

Storage materials also include palladium, and transition metals or other metals capable of forming storing interstitial gas.

However, the present invention is not limited to the storage of hydrogen gas. Storage materials may be used to store other gases, such as methane, other hydrocarbons, other fuels, halogens, or other gases, in particular gases that react with oxygen and/or water Particular embodiments of the present invention include methane storage within the interior cavity of a porous wall hollow glass microsphere.

Hollow Elements

Hollow elements may be in the form of hollow microspheres, tubes (such as cylinders), or other forms. Preferably, the hollow elements have porous walls to facilitate introduction of the storage material into one or more interior cavities by solution diffusion.

The hollow elements may be formed from any material that is substantially stable in the intended operating environment. Example hollow element materials include silica-containing glasses (including silica glass, silicate glasses, and the like), other glasses, polymeric materials, ceramics, xeolites, inert metals, and the like.

The material used to form the hollow elements may include other components or have other physical properties. For example, a coloring agent may be used to help identify the resulting composite storage material, an optical absorber used to prevent radiation from inducing decomposition of a material if the material is exposed to light, chemical stabilizers, catalysts to promote gas release, or other purpose.

Porous walls may be formed by acid etching of a material including an extractable component. In other examples, porous walls may be formed by any appropriate etching process, depending on the material used to form the hollow element.

The porous wall of a hollow element may have the form of a spherical shell. However, the wall need not be exactly spherical, and may be generally spheroidal. In other examples, the wall may be a prolate spheroidal shell, an elongate cylinder with capped or open ends, or other form.

The interior cavity may be a generally open space. However, in other examples, an interior cavity may include a lattice structure, particles, or other intrusions. There may be a plurality of interior cavities in a single hollow element.

Hollow Microsphere Formation

As described in US Published Application 2006/006820 to Schumacher et al., and also WO/2007/050362 to Wicks et al., hollow glass microspheres may be prepared using a glass composition that separates into two continuous glass phases after appropriate heat treatment. For example, one of the phases may be rich in silica, the other being an extractable phase such as a boron-containing material, for example borosilicates or alkali-metal borosilicates. Suitable borosilicates and alkali-metal silicates include the leachable glass fiber compositions disclosed in U.S. Pat. No. 4,842,620.

The glass components are mixed, melted, quenched, and crushed to a fine glass powder having a particle size of about 5 to 50 microns. The glass particles reheated to a temperature where a latent blowing agent causes a bubble to nucleate within each glass particle, and as the temperature increases, the pressure within the bubble exceeds the surface tension/viscous forces so that the bubble expands to form a hollow glass microsphere.

Using such an approach, as described in US Published Application 2006/0060820 to Schumacher et al., the resulting hollow glass microspheres have densities in the range of about 0.05 gm/cc to about 0.5 gm/cc, and diameters may range between about 1 to about 140 microns. Hollow glass microspheres may be separated on the basis of density so as to select microspheres according to a desired density range. Microspheres may also be separated according to their diameter.

The hollow glass microspheres may be heat treated to enhance the glass-in-glass phase separation. The extractable phase is readily leachable using strong mineral acids which results in the formation of wall pores within the remaining silica-rich phase. Suitable mineral acids and methods for leaching the glass are described in U.S. Pat. No. 4,842,620.

The resulting hollow glass microspheres have a high degree of cell wall porosity, in the form of a plurality of pores and similar openings which either directly or indirectly allow fluid communication between the interior and the exterior of the microspheres. An average cell wall pore diameter of about 10 Angstroms to about 1000 Angstroms can be achieved using this approach. The cell wall porosity is dependent upon the percentage of extractable components within the original glass composition, and the heat treatment employed. The extraction process can influence the size and density of pores formed. Such hollow glass microspheres with porous walls are well suited for use with examples of the present invention.

Encapsulation and Formation of Hydrogen Storage Composites

Storage materials can be introduced into the interior of porous-wall hollow elements using solution diffusion through the porous wall into the interior. The interior may optionally be vacated of air or other gases using a vacuum pump, the hollow elements dispersed through a storage material solution, and atmospheric or elevated pressure used to induce solution diffusion through the porous walls and into the interior of the hollow elements. Solvent may be removed using heat and/or reduced pressure, including vacuum drying. A number of solution diffusion steps may be used to increase storage material intake into the hollow elements.

Hydrogen, possibly in the form of high pressure gas introduced through the porous walls, may be used to further hydrogenate or otherwise reduce the storage material if desired. After encapsulation, hollow elements may be coated with a hydrogen-permeable membrane, for example by applying a coating material such as tetraethyl orthosilicate (TEOS) solution, or other silane or ormosil, to form a sol-gel layer. The hydrogen-permeable membrane can be chosen to permit the diffusion of hydrogen through the membrane, while excluding other gases. In other examples, the pore diameter may be initially formed to permit hydrogen diffusion through the pores while excluding other gases.

Hence, a material for the storage and release of hydrogen comprises a plurality of hollow glass microspheres, each microsphere a having porous wall enclosing an interior cavity including a gas storage material in the form of nanostructures of a solid metal hydride. The hollow glass microspheres may have a diameter of between 1 micron and 500 microns, and example solid metal hydrides include an alkali metal alanate, an alkaline earth metal alanate, an alkali metal borohydride, an alkaline earth metal borohydrides, or some combination of hydrides, such as a mixture of alanate(s) and borohydride(s).

The hollow elements undergo a surface treatment, for example being treated with a surfactant, so as to make at least the outer wall hydrophobic, so as to repel moisture. This may occur before or after introduction of a storage material.

Hydrogen Storage and Release

After encapsulation in the hollow elements, the storage material may be subjected to variations in temperature, pressure, or other stimulus so as to release hydrogen gas. A dehydrided storage material may then be used to selectively absorb hydrogen gas. Release and absorption of the hydrogen is possible through the porous walls of the hollow elements.

Some examples of the present invention relate to providing improved materials that facilitate the safer storage and release of a gas such as hydrogen, the material comprising a plurality of hollow elements having a porous wall (the wall including a plurality of pores, which need not be uniformly distributed) enclosing an interior cavity, the wall having an interior surface facing the interior cavity and an exterior surface, the interior cavity including a gas storage material, preferably solid state and including structures supported by the interior surface of the wall. The structures may include microcrystals and/or nanocrystals, and may include elongated crystals such as needle-shaped crystals. The elongated crystals may have a length, such as a median length, between 0.1 microns and 50 microns, more particularly between 0.1 microns and 10 microns, and a cross-sectional dimension (width) of less than 1 micron, more particularly between 0.1 microns and 1 micron.

The invention is not restricted to the illustrative examples described above. Example methods, materials, applications, and compounds described are exemplary, and are not intended to limit the scope of the invention. Changes therein, Having described our invention, we claim:

1. A material allowing the storage and release of a gas, the material comprising:
    a plurality of hollow elements, each hollow element having a porous wall surrounding an interior cavity, the porous wall having an interior surface facing the interior cavity,
    the interior cavity including a gas storage material in the form of elongate structures supported by the interior surface of the porous wall,
    the elongate structures being needle crystals grown from the interior surface of the porous wall,
    the elongate structures having a length to width ratio of at least approximately three to one,
    the hollow elements being hollow glass elements,
    the gas being hydrogen,
    the gas storage material being an alkali metal alanate or an alkaline earth metal alanate.

2. The material of claim 1, the elongate structures having a length between 0.1 microns and 10 microns, and a cross-sectional dimension of less than 1 micron.

3. The material of claim 1, the elongate structures having a length of between 0.1 microns and 50 microns, and a cross-sectional dimension of between 0.1 microns and 1 microns.

4. The material of claim 1, wherein the storage material is sodium alanate.

5. The material of claim 1, wherein the hollow elements are glass spheres.

6. The material of claim 5, wherein the glass spheres are glass microspheres having an average diameter of between 1 micron and 500 microns.

7. The material of claim 5, wherein the glass spheres are glass microspheres having an average diameter of between approximately 5 microns and approximately 100 microns.

8. The material of claim 5, wherein the porous wall includes pores having an average pore diameter in the range of 10 Angstroms to 3000 Angstroms.

9. The material of claim 5, wherein the porous wall has an average wall thickness of between 0.1 microns and 50 microns.

10. The material of claim 5, wherein the porous wall has a wall thickness of between approximately 0.5 microns to approximately 5 microns.

11. A material for the storage and release of hydrogen, the material comprising:
    a plurality of hollow glass microspheres, each hollow glass microsphere comprising a porous wall enclosing an interior cavity, the porous wall having an interior surface facing the interior cavity having an interior surface area,
    the hollow glass microspheres having an average diameter of between 1 micron and 500 microns; and
    a gas storage material disposed within the interior cavity, the gas storage material including elongate structures of a solid metal hydride supported by the interior surface of the porous wall,
    the gas storage material within the interior cavity presenting a surface area at least one order of magnitude greater than the interior surface area,
    the elongate structures being needle crystals grown from the interior surface of the porous wall,
    the gas storage material being an alkali metal alanate or an alkaline earth metal alanate.

12. The material of claim 11, wherein the solid metal hydride is sodium alanate.

* * * * *